UNITED STATES PATENT OFFICE.

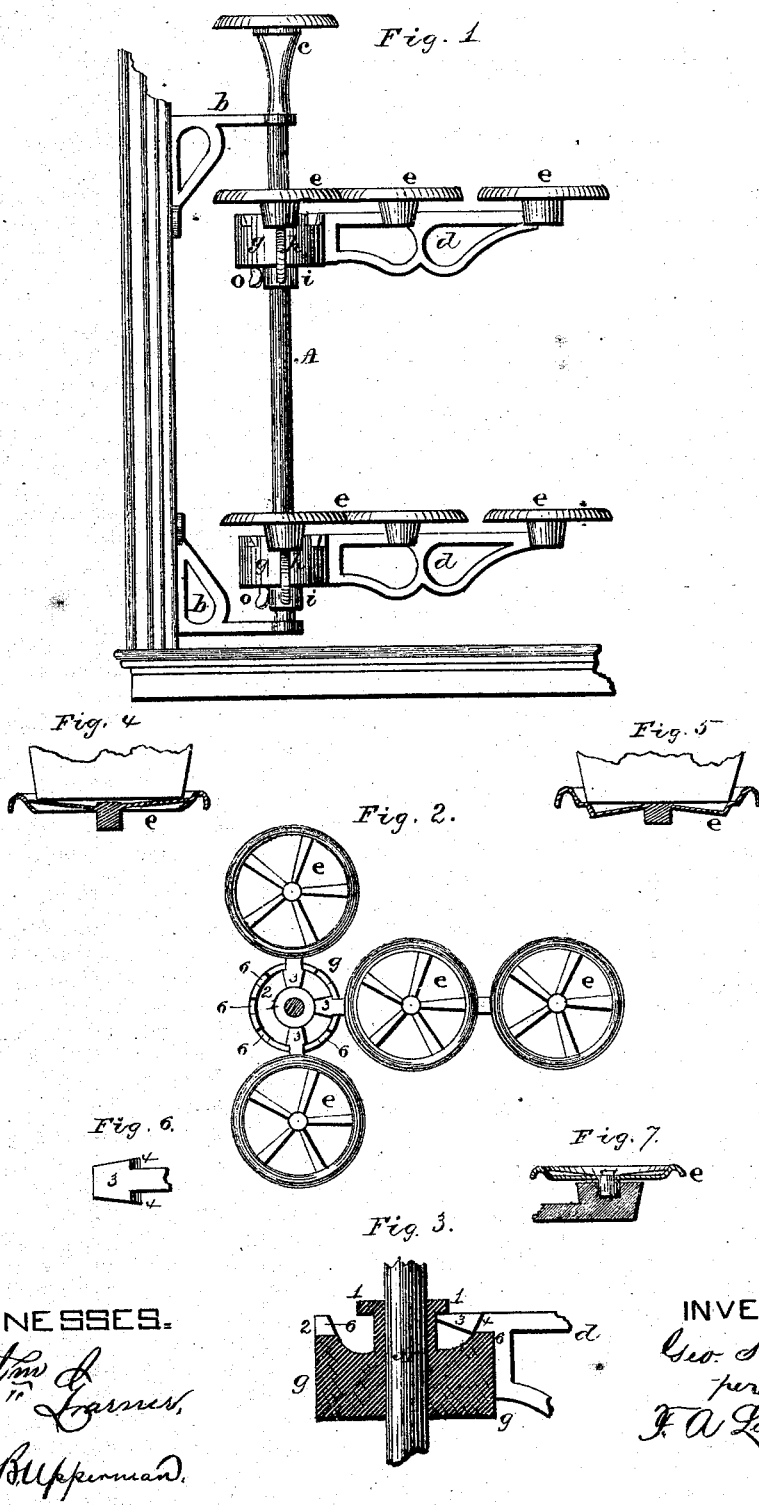

GEORGE HILLS, OF PLAINVILLE, CONNECTICUT.

IMPROVEMENT IN FLORAL STANDS FOR WINDOWS.

Specification forming part of Letters Patent No. 159,676, dated February 9, 1875; application filed January 7, 1875.

*To all whom it may concern:*

Be it known that I, GEORGE HILLS, of Plainville, in the county of Hartford and State of Connecticut, have invented certain new and useful Improvements in Floral Stands for Windows; and I do hereby declare the following to be a full, clear, and exact description of the invention, such as will enable others skilled in the art to which it pertains to make and use it, reference being had to the accompanying drawings, which form part of this specification.

My invention relates to an improvement in flower-stands for windows; and consists in the arrangement and combination of parts, that will be more fully described hereafter.

The accompanying drawing represents my invention.

A represents a standard, which is upheld vertically at both ends by brackets $b$, which brackets are fastened to the jambs of a window at a convenient height, and in any suitable manner. Three or any number of collars, $i$, with set-screws $o$, are slipped over this standard to be fastened to it, in order to support the revolving collars $g$, to which the arms $d$ are attached, and upon which arms are plates $e$, for the flower-pots to stand upon. Each of the collars $g$ has a horizontal flange, 1, formed around its upper edge, while around the outer edge, on a lower plane, at right angles thereto, is formed a vertical flange, 2, which has a series of notches, 6, cut in it. The space between the two flanges forms a socket to receive the inner ends, 3, of the supporting-arms $d$, which ends are provided with one or more shoulders, 4, which, when the heads are inserted into the sockets, catch behind the vertical flange, and thus prevent the arms from being drawn horizontally outward.

To insert the arms, the outer ends are first raised upward, the inner ends inserted at an angle into the socket until they catch under the horizontal flange 1, when the outer end is pressed downward, causing the shoulder 4 to catch behind the flange 2, while the arm itself catches in one of the notches 6, so as to prevent any lateral motion.

The arms, which increase in length downward, may be turned in any direction, either toward the windows or away from them toward the wall, as may be desired, and extend to one side only, or may have another shorter arm, $h$, in an opposite direction to the former.

The plates $e$, upon which the flower-pots stand, are stamped, and have a rounding rim on their edges. Upon the bottom of these plates are elevated ribs, from the center outward, so that air has free access under the pots. These ribs are slightly higher at the rim, so that the center does not come in contact with the under side of the pots when standing on them.

Depressions may also be made in the bottom, instead of the raised ribs.

An urn, C, or other suitable ornament, is placed upon the top of the standard, which urn may also be used for a flower-pot.

Flower-stands of the usual form and size occupy much space, and are therefore objectionable, especially in small apartments.

It is my object by the present invention to substitute a flower-stand which will occupy but little space, and offer the same, if not greater, advantages to tastefully display a number of flowers in apartments where they otherwise could not be kept for want of room.

Having described my invention, I claim—

1. The combination of the brackets $b$, standard A, vertically-adjustable rotating collars $g$, rings $i$ $o$, arms $d$, and pans $e$, substantially as shown and described.

2. The collar $g$, provided with the horizontal flange 1, under which the end of the arms catch, and the notched flange 2 6, substantially as shown and described.

3. The arms $d$, provided with sockets for receiving the pans, and having the shoulders 4, for catching behind the flange 2 on the collar, substantially as specified.

4. The combination of the arms $d$, having sockets to receive the pans, and the shoulders 4, in combination with the collar $g$, having the two flanges 1 2, placed at right angles to each other, the flange 2 having the notches 6, substantially as set forth.

In testimony that I claim the foregoing I have hereunto set my hand this 3d day of November, 1874.

GEORGE HILLS.

Witnesses:
E. N. LEWIS,
JAMES FORD.